United States Patent [19]

Johansing, Jr.

[11] Patent Number: 5,705,140
[45] Date of Patent: Jan. 6, 1998

[54] PROCESS FOR THE TRANSFORMATION OF HALOGENATED REFRIGERANT GASES

[75] Inventor: P. G. Johansing, Jr., San Marcos, Calif.

[73] Assignee: Transformation Technologies, Ltd., Hurst, Tex.

[21] Appl. No.: 503,560

[22] Filed: Jul. 18, 1995

[51] Int. Cl.$^6$ .................. C01F 11/20; C01F 11/22
[52] U.S. Cl. ............... 423/490; 423/240.5; 423/431; 423/497; 588/209; 588/213
[58] Field of Search ................. 588/209, 213, 588/490; 423/497, 431, 240 S

[56] References Cited

U.S. PATENT DOCUMENTS

| | | | |
|---|---|---|---|
| 2,941,860 | 6/1960 | Annis | 423/431 |
| 3,804,386 | 4/1974 | Arnold et al. | |
| 3,845,191 | 10/1974 | Bruce | 423/490 |
| 4,125,593 | 11/1978 | Scheifley et al. | 422/182 |
| 4,937,065 | 6/1990 | Maurer et al. | 423/240 S |
| 5,185,134 | 2/1993 | Gullett | 423/240 S |
| 5,250,267 | 10/1993 | Johnson et al. | |
| 5,326,919 | 7/1994 | Paisley et al. | 585/241 |

FOREIGN PATENT DOCUMENTS 212410 3/1987 European Pat. Off. .

OTHER PUBLICATIONS

Plasma Reactor for Destruction of Chlorofluorocarbons—The Battle to Save the Environment—A Japanese Experience; conference paper; International CVC & Halon Alternatives Conference; 1994 Oct. 24–26; Washington, D.C.
Glidarc Plasma Assited Processing of CFS; Abstract; Workshop on Ozone Depleting Substances (ODS) Disposal Opportunities; "Identifying Needs & Solutions"; 1995 May 2–3; Montreal, Canada.
Mizuno, Koichi; Destruction of ODS by Inductively--Coupled R.F. Plasma; paper and handouts; National institute for Resources & Environment Agency of Industrial Science & Technology, Ministry of International Trade & Industry; Japan.

Primary Examiner—Wayne Langel
Attorney, Agent, or Firm—Grady K. Bergen

[57] ABSTRACT

The high temperature combustion of hydrogen and oxygen is used to transform halogenated refrigerant gases (HRGs) and halons to produce calcium fluoride salts. Calcium carbonate is also produced by a series of chemical processes. Calcium chloride is partially consumed by the process by reaction with fluoride released during the high temperature combustion of the HRGs. Calcium chloride is also produced in the process during scrubbing of chlorine and during the recovery of ammonia used to remove carbon dioxide. The calcium chloride produced during the process can be used in the combustion reaction to further produce calcium fluoride.

21 Claims, 4 Drawing Sheets

PROCESS FOR THE TRANSFORMATION OF HALOGENATED REFRIGERANT GASES

BACKGROUND OF THE INVENTION

1. Field of the Invention

This invention relates to chemical processes for transforming halogenated hydrocarbon gases, particularly hydrofluorocarbons manufactured for use as refrigerants, into useful salts.

2. Description of the Prior Art

Due to their damaging affect on the stratospheric ozone layer, regulation of halogenated refrigerant gases (HRGs) containing chlorine have increased. Stratospheric ozone is depleted as a consequence of ultra-violet solar radiation, which frees chlorine from HRGs to produce chlorine monoxide. This in turn reduces ozone to its precursor, oxygen. The rate of ozone replenishment, i.e. conversion of oxygen to ozone by UV radiation, is much slower than that of the ozone depletion which is currently being experienced. Depletion of the ozone layer results in increased UV exposure through the earth's surface which can have serious consequences, such as increased skin cancer in humans, reduction of immune protectiveness and increased plant and animal mutations.

Because of their environmental damage potential, disposal and reclamation of these HRGs has become increasingly important. Examples of HRGs are hydrofluorochlorocarbons, like HCFC-22, or chlorofluorocarbons, like CFC-11 and CFC-12. Halons, used as streaming agents for firefighting, are similar to HRGs, but contain bromine in addition to chlorine and fluorine.

Since the implementation of laws prohibiting the venting of HRGs into the atmosphere, HRGs like HCFC-22 are oftentimes recovered from used equipment, especially air-conditioning and heat pump systems. One of the problems associated with reclamation of HRGs is the increase of cross-contamination of HRGs which can easily occur by the accidental action of those handling these substances. Failure to identify cross-contamination can result in loss of service performance or equipment failure. Identification and appropriate separation techniques for purifying or recovering cross-contaminating refrigerant gases are complex and expensive. In some cases, cross-contaminated HRGs are sometimes diluted with uncontaminated HRGs as a disposal remedy. However, due to the small amount of cross-contamination which is acceptable, this does not provide a reasonable alternative to disposing and reclamation of cross-contaminated refrigerant gases.

The disposal of mixed HRGs, that cannot be reclaimed are typically disposed of by incineration. Typically HRGs are incinerated in cement lined kilns. It is necessary to inject a low percentage of HRGs compared to other non-HRG gases undergoing destruction to prevent destruction of the cement lining of the incineration kiln. Thermal oxidation of HRGs typically produces hydrochloric and hydrofluoric acids. These very corrosive acids attack and damage the exposed cement lining and metal fixtures of the kiln.

When HRG and halon gas is destroyed by thermal processes, it has been a standard practice for products of the thermal destruction process to be scrubbed with sodium hydroxide and the sodium salts produced are then disposed in landfills after stabilization. The water solubility of sodium fluoride is 4% by weight, compared to the water solubility of sodium chloride, which is 25% by weight. There is not sufficient economic value to afford chemical separation of sodium halide salts of this type, such as by solvent evaporation or fractional precipitation. Disposal of these mixed halide salts results in both the waste of economic resources and posses a potential environmental hazard to ground water when disposed as a sodium salt in high concentrations. To reduce the cost of destruction for HRGs, an improved process is required for destruction which does not damage the reactor and can recover economic products for commercial use. The current high cost for thermal destruction of HRGs increases the potential for owners of mixed HRGs to illegally vent these gases into the atmosphere.

At the present time, there are only two commercial processes that recover useful halogens from the destruction of HRGs and can offset the cost of destruction by the reuse or sale of economic products. One process was first developed by Hoechst AG, Frankfurt, Germany. A description of the process is found in European Patent No. 0212410. The Hoechst process uses a hydrogen and oxygen combustion reaction to first heat disposed HRGs to oxidize carbon and release chlorine and fluorine gases. The gases are hydrated and fractionated to produce hydrochloric and hydrofluoric acids and chlorine gas. Carbon dioxide is vented to the atmosphere by the Hoechst process and is not recovered. Hoechst refers to their process as "reactor cracking."

DuPont Chemicals, Wilmington, Del., has also developed a process similar to Hoechst that produces useful hydrofluoric acid that can be used by DuPont for the production of commercial chemicals including HRGs that do not deplete the ozone layer. The DuPont process converts hydrochloric acid to calcium chloride that can be sold. While it is practical for users of hydrofluoric and hydrochloric acid to reclaim these toxic and very corrosive acids for their own use, the technology employed is not applicable to wide deployment in light industries associated with the reclamation of HRGs and halons.

The US-EPA has promulgated rules for both destruction and transformation of controlled substances like HRGs under the Clean Air Act Amendments of 1990, Title 6, Subpart 82, "Protection of Stratospheric Ozone," (amendments published in 40 CFR Chapter 1, page 340, Jul. 1, 199.) The US-EPA defines transformation as a process that uses and entirely consumes (except for trace quantities) a controlled substance in the manufacture of other chemicals for commercial purposes.

The percentage of carbon contained in HRGs and halons is about 10% by weight. During thermal oxidation of HRGs and halons, carbon is converted to carbon dioxide, which is not a trace product of the reaction. As a result of this definition, neither the Hoechst nor the DuPont process is a transformation process because carbon dioxide, contained in HRGs and halons, is manufactured and vented to the atmosphere.

SUMMARY OF THE INVENTION

A method of forming calcium fluoride salts from fluorocarbon gases is accomplished by introducing a mixture of oxygen, hydrogen, steam and a fluorocarbon gas into a reactor. A calcium reagent, such as calcium chloride, is simultaneously injected into the reactor with the mixture. The mixture is ignited within the reactor to form decomposition products with fluorine being released within the reactor to react with the calcium reagent to thus form calcium fluoride.

The decomposition products formed from the decomposition of the fluorocarbon gas are cooled by contacting the decomposition products with an aqueous cooling fluid. The cooling fluid also collects and carries the decomposition products along with calcium fluoride which is precipitated as particles in an aqueous liquid phase. The liquid phase is then filtered to separate the calcium fluoride particles from the aqueous liquid phase.

Carbon dioxide, which is one of the decomposition products, is treated to form calcium carbonate. Carbon dioxide gas is intermixed with ammonia and an aqueous solution of calcium carbonate. The carbon dioxide reacts with ammonia and calcium chloride to form a calcium carbonate precipitate which is carried in the aqueous solution. The precipitate is then filtered to remove the calcium carbonate from the aqueous solution.

DETAILED DESCRIPTION OF THE PREFERRED EMBODIMENT

The process disclosed entirely transforms HRGs and halons into useful chemicals for commercial purposes. The products manufactured should have sufficient economic value in the current marketplace to enable their economic transformation to produce useful products without being subsidized by expensive disposal fees. The process avoids the production of highly toxic and hazardous chemicals like hydrofluoric and hydrochloric acid so that the process technology can be widely deployed in locations where the production of hazardous materials would not be acceptable or would be subject to costly sitting requirements.

Fluorophosphate phosphors which are used in coating fluorescent lamp tubes require high purity fluorine as a starting feedstock. High purity calcium fluoride manufactured in the process described by the transformation of HRGs can be used as a source of fluorine for this purpose. The production of high purity calcium fluoride begins when calcium chloride produced by transformation of chlorine is reacted with commercial lime. Once the impurities contained in commercial lime are removed by a standard purification process, high-purity calcium chloride is injected in a thermal oxidation reaction to produce calcium fluoride. Calcium chloride and calcium fluoride can easily be separated by fractional precipitation because calcium chloride is 74% soluble by weight in water while calcium fluoride is only 0.17% soluble by weight in water.

Calcium carbonate, used to remove acids during precipitation of calcium fluoride, has similar low solubility, which is 0.16% soluble by weight in water. However, calcium carbonate is entirely consumed by reaction with acids during precipitation of calcium fluoride where additional calcium chloride is produced. The precipitation of calcium fluoride in a solution of calcium chloride is further enhanced by the common ion effect when highly soluble calcium chloride is present when calcium fluoride is precipitated.

The process disclosed is a true transformation process. The process not only recovers high-purity calcium halides, but recovers carbon dioxide which is beneficial because of its reaction with high-purity calcium chloride and ammonia to produce high purity calcium carbonate. Produced, high-purity calcium carbonate is used in the process and is also required for use in the manufacturing of halophosphate phosphors.

The primary chemical equations which relate to the transformation of HRGs and halons are shown as they relate to the transformation of typical HRGs, such as dichlorodifluoromethane, also called CFC-12. The reactions and balanced equations are written and described below.

The primary combustion reaction to produce heat and steam following ignition of a stream of mixed hydrogen and oxygen in a tube reactor is written as $$2H_2 + O_2 \rightarrow 2HOH. \tag{a}$$

When HRGs or halons, such as dichlordifluoromethane, are heated above 3,000° F., the reaction products that occur as a result of the high temperatures produced by equation (a) are monoatomic halides and carbon dioxide gases. This can be represented according to the general equation below where the halides consist of chlorine and fluorine.

$$zO_2 + Cl_xF_yC_z \rightarrow xCl + yF + zCO_2. \tag{b}$$

When high temperature steam is produced according to equation (a) above, it reacts with monoatomic fluorine and the result is hydrogen fluoride and oxygen gas according to $$4F + 2HOH \rightarrow 4HF + O_2. \tag{c}$$

As taught by the invention, calcium chloride is propelled by the injection of HRGs and oxygen into a tube reactor at the same time the thermal reactions (a), (b) and (c) take place. The reaction products of hydrogen fluoride and calcium chloride are calcium fluoride and hydrogen chloride which can be written as $$CaCl_2 + 2HF \rightarrow CaF_2 + 2HCl. \tag{d}$$

Although calcium chloride is the preferred reagent for the reaction (d), it should be noted that other calcium reagents will work also. In addition to calcium chloride, calcium hydroxide, calcium oxide and calcium carbonate can be used to react with the hydrogen fluoride produced in reaction (c) to produce calcium fluoride.

A sub-reaction is necessary to prepare high purity calcium chloride where ammonium polysulfide or chelate substance is reacted with calcium chloride and a precipitated insoluble metal sulfide or chelate is precipitated and filtered by sub-micron filtration, leaving purified calcium chloride. One form of this reaction can be written as $$ZnCl_2 + (NH_4)_2S_x \rightarrow ZnS + 2(NH_4)Cl. \tag{e}$$

Hydrochloric acid formed in reaction (d) above is neutralized by the addition of purified calcium carbonate in the precipitation tank according to $$CaCO_3 + 2HCl \rightarrow CaCl_2 + CO_2 + HOH. \tag{f}$$

An optional sub-reaction is noted that can be used to produce high-purity calcium carbonate to start the process.

High-purity calcium chloride can be reacted with high-purity ammonium carbonate to produce high-purity calcium carbonate with ammonium carbonate is first purified according to (e) above.

The removal of chlorine gas which has not been transformed into hydrogen chloride is accomplished by scrubbing chlorine gas with hydrogen peroxide at an optimum pH of about 8.4. Conversion of hydrogen chloride to hydrochloric acid provides a fast reaction with lime. Oxygen is released by the reaction and is collected and stored for the combustion reactions (a) and (b). The hydrogen peroxide reaction with chlorine is written $$Cl_2 + H_2O_2 \rightarrow 2HCl + O_2 \qquad (g)$$

Hydrogen chloride immediately reacts with calcium hydroxide (lime) to produce calcium chloride which can be purified according to (e) above and used in the reaction (d) above. The use of a mixture of a lime solution with hydrogen peroxide provides a method to maintain an optimum pH of 8.4 required by (g) and the lime reaction with hydrochloric acid is shown as $$2HCl + Ca(OH)_2 \rightarrow CaCl_2 + 2HOH. \qquad (h)$$

The production of precipitated high-purity calcium carbonate can make use of produced high-purity calcium chloride, where carbon dioxide, produced according to (b) and (f) above, is used productively. Ammonia gas and carbon dioxide resulting from (b) and (f), react with high-purity calcium chloride, to produce high-purity calcium carbonate and ammonium chloride (salammoniac) and calcium carbonate is removed by filtration leaving a solution of ammonium chloride as a by-product shown by the equation $$CaCl_2 + 2NH_3 + CO_2 + HOH \rightarrow CaCO_3 + 2(NH_4)Cl. \qquad (i)$$

The scrubbing of carbon dioxide becomes less efficient according to (i) above when calcium is consumed by the production of ammonium chloride. Ammonia gas can be recovered for reuse by the production of calcium chloride by processing with heat and lime according to $$2(NH_4)Cl + Ca(OH)_2 \rightarrow CaCl_2 + 2NH_3 + 2HOH. \qquad (j)$$

Not shown in the above equations are sub-reactions such as may occur in reaction (g) and (i) above. In reaction (g) above, ammonium carbonate is formed but immediately removed by reaction with calcium chloride. In reaction (i) above, there can be an intermediary formation of calcium peroxide. The production of hydrochloric acid removes all calcium peroxide. Some hypochlorous acid, produced in reaction (g) above, is immediately removed by reaction with hydrogen peroxide.

There is little potential to produce polychlorinated dibenzoparadioxins (PCDD) or polychlorinated dibenzofurans (PCDF). The kinetics for formation of these highly toxic halogenated hydrocarbons require specific kinetics which are absent from the process invented and work well in the presence of a copper catalyst, where copper is absent from the process. In the event these or any other toxic gases are produced, they are destroyed when oxygen and all other trace gases produced and not condensed are recycled back through the high temperature thermal combustion reaction.

Due to its high solubility in water, solutions of calcium chloride, produced by the reaction processes (h) and (j) above, can be purified according to (e) above for use in the formation of high-purity calcium fluoride according to reaction (d) above and high-purity calcium carbonate according to (i) above. Because of the solubility of sodium, when high percentages of sodium are found in lime, it must either be washed with sodium-free water, or not used for the process.

The process described herein makes use of the fact that there are sources of low-sodium lime available at a lower cost than sodium-free calcium chloride. Since the solubility of lime (calcium hydroxide) in water is about 0.1%, washing to remove trace sodium is practical. As a result of the efficacy for using an efficient purification process (e) above, high-purity calcium halides and calcium carbonate can be produced using lime as a feedstock to first manufacture and purify calcium chloride. Calcium chloride manufactured in this way is the best reagent for use in reaction (d) above and for the economic manufacturing of industrial high purity calcium salts.

Once manufactured, the high solubility of calcium chloride is also very beneficial for reaction with thermally oxidized halogen gases from a kinetics standpoint, since its solubility in water is orders of magnitude greater than other forms of calcium and provides a high density of calcium ions to react with hydrofluoric acid when present according to reaction (d) above. The rate of reaction between calcium ions and fluoride ions must be as high speed as possible to assure the immediate formation of precipitated calcium fluoride to remove fluorine gas produced in reaction (b) above. Fluorine gas, once hydrolyzed to hydrogen fluoride according to reaction (c), due to the favorable kinetics, immediately reacts with abundant calcium ions that are injected into the reaction. Additional calcium ions are also transferred with cooling liquid from the precipitation tank, described below, as a result of the reaction (f) between calcium carbonate and hydrochloric acid in the well mixed cooling water supplied to the tube reactor and condenser described herein.

The formation of calcium fluoride in the presence of carbon dioxide, using calcium chloride as a calcium feedstock, is predicted by thermodynamic calculations. At a temperature as low as 2,500° K., the net free energy of formation of hydrogen fluoride is −85 kilocalories per mole. The temperature of hydrogen and oxygen combustion according to (a) is well above this temperature.

The process described also provides a method for Using inexpensive lime to manufacture raw calcium chloride by the scrubbing of chlorine gas according to the combination of reactions (g) and (h) above. Not only do these reactions have utility in the process invented, but there is a wide need to replace sodium scrubbing processes which result in the waste of sodium and chlorine, which after being reacted in a sodium hydroxide scrubbing process, end up in landfills. When sodium chloride is disposed in an unprotected landfill or if a barrier leaks, sodium contamination of ground water can occur. Sodium chloride can reduce water percolation in loam and clay soils.

Direct reaction of lime with chlorine gas, as has been described, is usually not efficient unless there is a low percentage of chlorine, such as in flue gas resulting from the combustion of coal. When lime is used for flue gas scrubbing, it is used to react mainly with sulfur oxides and the resulting salts are disposed in landfills. One problem associated with using lime as a scrubbing agent, when there is a high percentage of chlorine gas to scrub, is the production of a slurry of unreacted lime that is difficult to dispose. This condition is further complicated when a spray or mist scrubber is used with lime to otherwise avoid scaling and precipitation of lime that typically occurs in a more efficient packed scrubber towers. Packed towers are practical when sodium hydroxide is used as a scrubbing agent because of the high solubility of sodium hydroxide.

According to the process described, lime can be used practically in a packed tower and reacted stoichiometrically with hydrochloric acid that is produced from chlorine gas by an association with hydrogen peroxide according to reactions (g) and (h) above. Although hydrogen peroxide is more expensive than lime, it is typically manufactured at the lowest cost by a process which also produces acetone. Both acetone and hydrogen peroxide have growing markets and the economies of scale have consistently reduced the cost for manufacturing these chemicals in combination.

The process of employing hydrogen peroxide and lime to scrub chlorine gas, especially in a packed tower scrubber, is similar to using hydrogen peroxide to remove traces of chlorine gas from waste water, which is well known. Using hydrogen peroxide for scrubbing chlorine gas in a packed scrubber tower, where lime is used to maintain an optimum pH condition and as a reactant to sequester chlorine according to reaction (g) above is surprising. The process requires the combined use of reactions, (g) and (h) above, to scrub chlorine to produce useful calcium chloride for industrial uses. The invention avoids the typical use of sodium hydroxide to scrub chlorine, when chlorine is vented accidentally or when chorine produced as a waste gas in a wide variety of chemical facilities is scrubbed and eventually ends up in a landfill.

Oxygen, produced by the reaction of chlorine with hydrogen peroxide according to (g) makes pure oxygen available which does not contain traces of argon and helium. Trace gases, like argon, helium and nitrogen, can accumulate where oxygen is first obtained by standard air fractionation processes that produce oxygen. This is significant because the recycling of produced oxygen increases the concentration of these inert gases until oxygen is diluted and no longer efficient as an oxidizer of hydrogen and carbon. Oxygen that is recovered according to reaction (g) above enables hydrogen peroxide to be used more productively.

Calcium chloride, manufactured by the process, also has utility for scrubbing carbon dioxide by reaction with ammonia and carbon dioxide according to reaction (i) above. Ammonia gas can be recovered from produced ammonium chloride to produce additional calcium chloride by reaction (j). Following purification of this calcium chloride according to reaction (e) above, the purified calcium chloride can be used to produce additional precipitated high-purity calcium carbonate in accordance with (i) when scrubbing carbon dioxide. The scrubbing of carbon dioxide is well known, for example by use of monoethanolamine. The manufacturing of ammonium carbonate by direct reaction of carbon dioxide with ammonia gas is typically employed to manufacture industrial ammonium carbonate. However, precipitated calcium carbonate can be produced by reactions that combine ammonia, carbon dioxide and calcium chloride.

Ammonium carbonate is costly to manufacture commercially and is not produced in high volumes to allow for more beneficial economics of scale. The preparation of high-purity ammonium carbonate as set forth herein is practical for start-up of the process which requires high-purity calcium carbonate to be manufactured from purified ammonium carbonate and purified calcium chloride. It is more economical to precipitate calcium carbonate with ammonia when available carbon dioxide and a concentrated solution of calcium chloride is available.

Accordingly, calcium carbonate can be produced for use as a reagent to control the acidity produced by hydrochloric and hydrofluoric acid produced by the process and as a commercial product of the process by scrubbing carbon dioxide beneficially. Other processes that destroy HRGs and halons vent carbon dioxide to the atmosphere. International attention has focused on the over-production of greenhouse gases, especially carbon dioxide. The process described not only avoids the venting of carbon dioxide contained in HRGs and halons, but also avoids the atmospheric venting of carbon dioxide resulting from processes where hydrocarbon fuels are used for combustion and thermal energy. While it is possible to use hydrocarbon fuels like acetylene or propane in the process, hydrogen is preferred because of its high-purity and high-temperature of combustion.

The employment of reaction (j) above to recycle ammonia, once manufactured into ammonium chloride according to (i), requires energy. According to the process invented, the energy required can be supplied by waste heat, such as steam produced by a solvent evaporator used in the process, to concentrate calcium chloride solution. Waste heat is typically available in many industrial processes where carbon dioxide is also vented to the atmosphere.

Oxygen produced by reaction (g) above is recovered along with oxygen that is vented into the combustion reaction excessively to prevent unreacted hydrogen (or other fuels) from accumulating in process vessels. Oxygen is also used excessively to transfer other reaction products like acid gases and carbon dioxide efficiently through reaction processes. Trace ammonia gas, released during the manufacturing of precipitated calcium carbonate can be carried with recycled oxygen to the combustion reactor and can be converted into nitrogen and nitrous oxides.

In a non-vented process, nitrogen scrubbing would be necessary to remove not only accumulated nitrogen produced from oxidized ammonia gas but $NO_x$ that is formed. The removal of ammonia gas prior to storage of excess oxygen is essential. Ammonia gas is typically removed by scrubbing with dilute hydrochloric acid. The ammonium chloride solution produced is later removed by reaction with lime in a reaction process that is described below. There is the possibility that some chlorine gas may be carried to the combustion reaction along with oxygen that is reclaimed by the process. Trace chlorine gas injected into the combustion reaction is treated along with other chlorine that is produced by the transformation of HRGs and halons.

According to the chemical reactions written and described above, no special case was made for the transformation of halons, where bromine is a mixture with chlorine throughout the transformation process. In the case of halon transformation, produced mixtures of calcium chloride and calcium bromide solution result. The separation of calcium bromide from calcium chloride can be accomplished by several methods. The process can treat a mixture of raw calcium bromide and calcium chloride as it would raw calcium chloride and the formation of the mixture is the same as for calcium chloride in the process due to the high solubility of calcium bromide. While there is no current market for high purity calcium bromide mixed with calcium chloride, high purity calcium fluoride and calcium carbonate can be manufactured by the mixed halides as is taught without loss to the quality of high purity calcium fluoride and calcium carbonate.

There is a very large and growing market for the blend of calcium chloride and calcium bromide used as a replacement for mud drilling fluids. Replacement of mud containing heavy minerals like barium with clear soluble halide drilling fluids has opened a large market for sale of the mixed mineral salts. A suitable drilling fluid can be produced which has a specific density range between 1 and 2.6 using mixed raw calcium bromide and calcium chloride as a starting material. Additional calcium bromide or calcium chloride can be added to achieve the exact right density for a specific application required for a clear drilling fluid.

Referring to the figures, a plant layout and process equipment used for carrying out the method of the invention are shown. The process equipment shown and described are suitable for transforming up to 20 pounds per hour of a typical HRG, such as CFC-12. One of ordinary skill in the art will appreciate, however, that different amounts of HRGs can be processed based upon the specific type and capacity of the process equipment used. The process equipment described should thus in no way serve to limit the scope of the invention.

At the start of the process, high purity reactants are obtained or prepared according the processes described above. Hydrogen and oxygen are prepared by electrolysis of deionized water which has been slightly reionized with high-purity calcium chloride. As an option, commercial water electrolysis equipment, such as the EI-250, manufactured by The Electrolyser Corporation, Ltd., Toronto, Canada, can be used to produce hydrogen and oxygen up to 99.999% pure.

Figure 1:
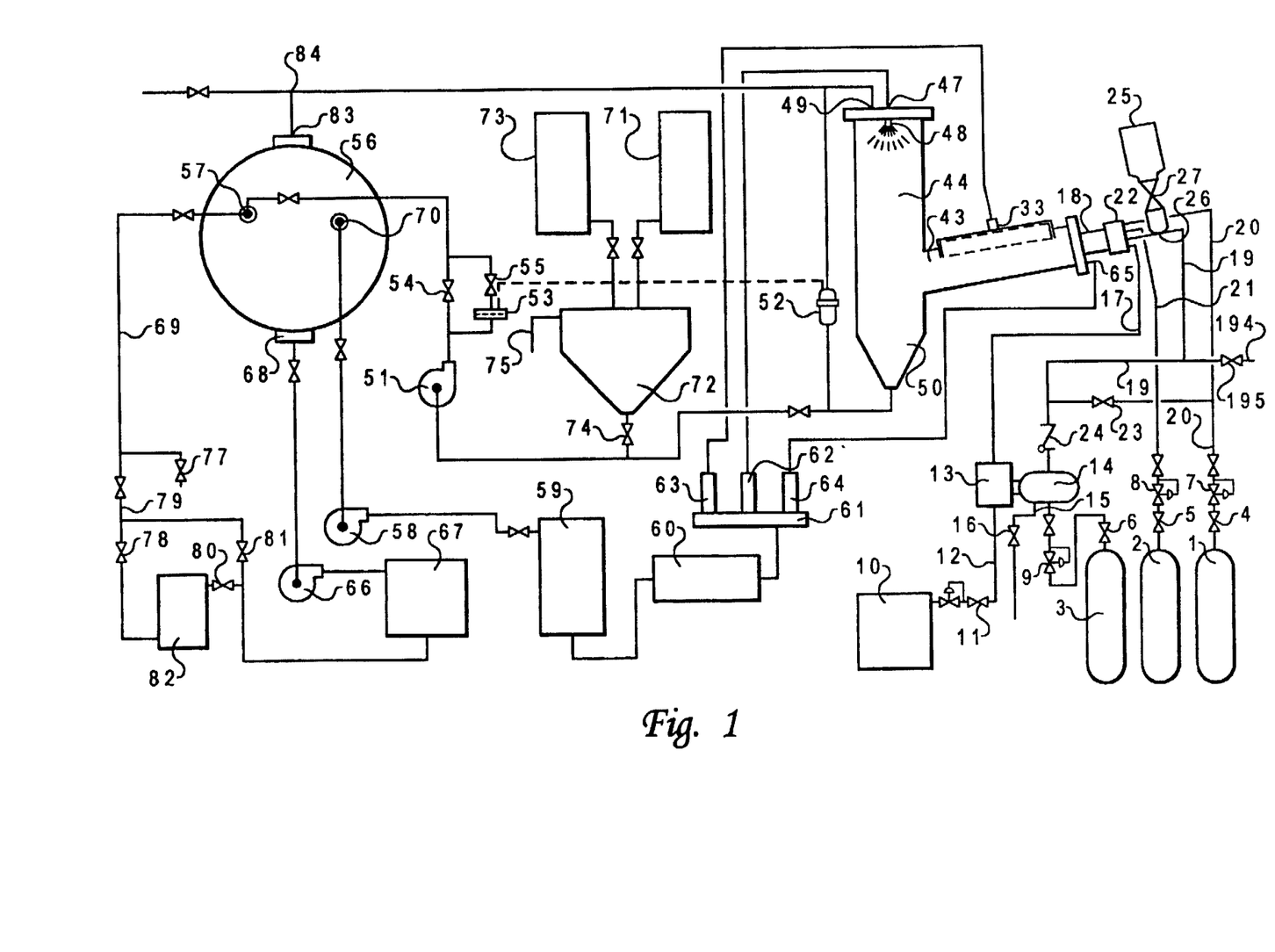
FIG. 1 is a schematic view of a first half of a plant used in carrying out the method of the invention.

Referring now to FIG. 1, oxygen, hydrogen, and HRGs are stored for use in storage tanks (1), (2) and (3). The high pressure oxygen and hydrogen gas tanks are equipped with manual pressure regulators (4) and (5) and a manual control valve (6) is installed on the HRG tank to permit release of both liquid and gas, depending on the gas stored for transformation, the tank volume and ambient temperature. Combination shut-off and flow control valves (7), (8) and (9) may be installed following the regulators. Combination shut-off valves are preferred that are electronically controlled mass flow control valves such as series FMA-100 manufactured by Omega Engineering, Stamford, Conn.

A steam boiler (10) has a minimum heating capacity of 2 KW and is equipped with a manual or optional electric controlled shut-off valve (11) connected by a conduit (12) to a heat-exchanger (13). The heat-exchanger (13) provides heat to a HRG evaporator/boiler (14) into which HRGs are vented from tank (3) so that boiling occurs to remove oils and trace impurities through outlet (15) controlled by valve (16). Steam under pressure enters conduit (17) from heat exchanger (13) which is connected to a thermal spray gun (TSG) burner assembly (18). A suitable commercial TSG burner is that such as the "UTP Mini-spray Jet", available from UTP Welding Products, Houston, Tex., where the powder attachment has been closed to allow calcium chloride to be injected from a calcium chloride dispenser (25). HRGs evaporated in boiler (14) are carried to a connection to the combustion burner by conduit (19). Oxygen and hydrogen gas, enter conduits (20) and (21) which connect to the TSG burner (18).

Conduits (19) and (20) are connected outside of the burner (18) at junction (22). A valve (23) controls oxygen vented into conduit (19) that is mixed with HRGs or halons. Control of the blending of oxygen with HRGs is provided to maintain proper stoichiometric balance according to reaction (b) above. The potential higher pressure of oxygen compared to HRGs or halons that are vaporized in boiler (14) can allow oxygen to enter the boiler (14) in the event of low boiler pressure. Entry of oxygen into the boiler (14) is prevented by the check valve (24) in conduit (19). The temperature of the boiler (14) that is heated by heat exchanger (13) is controlled to maintain a sufficient gas pressure of HRGs or halons released into the conduit (19) to allow controlled blending of HRGs and halons with oxygen vented into the conduit (19) by control valve (23) located between conduit (19) and conduit (20).

The calcium chloride dispenser (25) is attached to conduit (24) at a calcium chloride injection inlet (26) where the rate of flow of calcium chloride is controlled by a valve (27). High-purity calcium chloride is supplied either as a powder or solution. A provision for attachment of the appropriate dispenser (25) for high-purity calcium chloride, either as a powder or liquid solution must also accommodate the quantitative injection of oxygen and HRGs or halons to propel the calcium chloride reactant into the combustion burner. A variable speed electric motor (not shown) can drive a rotary valve to dispense powdered calcium chloride powder from a sealed powder dispenser. Since calcium chloride is hydroscopic, injection of powdered calcium chloride requires that moisture be absent to avoid bridging in the dispenser. The addition of a sonic vibrator (not shown) can also improve the handling of powdered calcium chloride when some moisture is present. Optionally, a concentrated liquid solution of calcium chloride can be more easily dispensed from a sealed vessel equipped with the control valve (27).

The burner assembly (18) is formed from a burner nozzle (30) constructed from concentric rings or conduits (30A) radially spaced apart and surrounding a central conduit (30B) to define annular passages or apertures (30C). The reactants, hydrogen gas, oxygen gas and calcium chloride are injected into an inlet end of a reactor tube (29) (FIGS. 2 and 3) through the central conduit (30B) and annular passages (30C). An outermost ring or conduit (30D) delivers steam generated by the boiler (10) and which has first passed through the heat exchanger (13) and the steam hose (17). This outermost ring (30D) is a variable orifice ring and allows the steam, which acts as a cooling gas, to either diverge or converge. This causes a low pressure area that either widens or narrows the pattern being flame sprayed. Typically, the cooling gas orifice ring (30D) is manufactured so that the spray pattern can be controlled by removing, reversing and reinstalling the orifice ring (30D).

Hoses used to supply steam should be insulated and of minimum length to minimize condensation. A steam trap can be installed between the heat exchanger (13) and the TSG burner (18) to remove condensed steam as a result of passing through the heat exchanger (13), before injection through the outermost ring (30A) of the TSG burner nozzle (30) (FIG. 2) and injection into the reactor tube (29).

Figure 2:
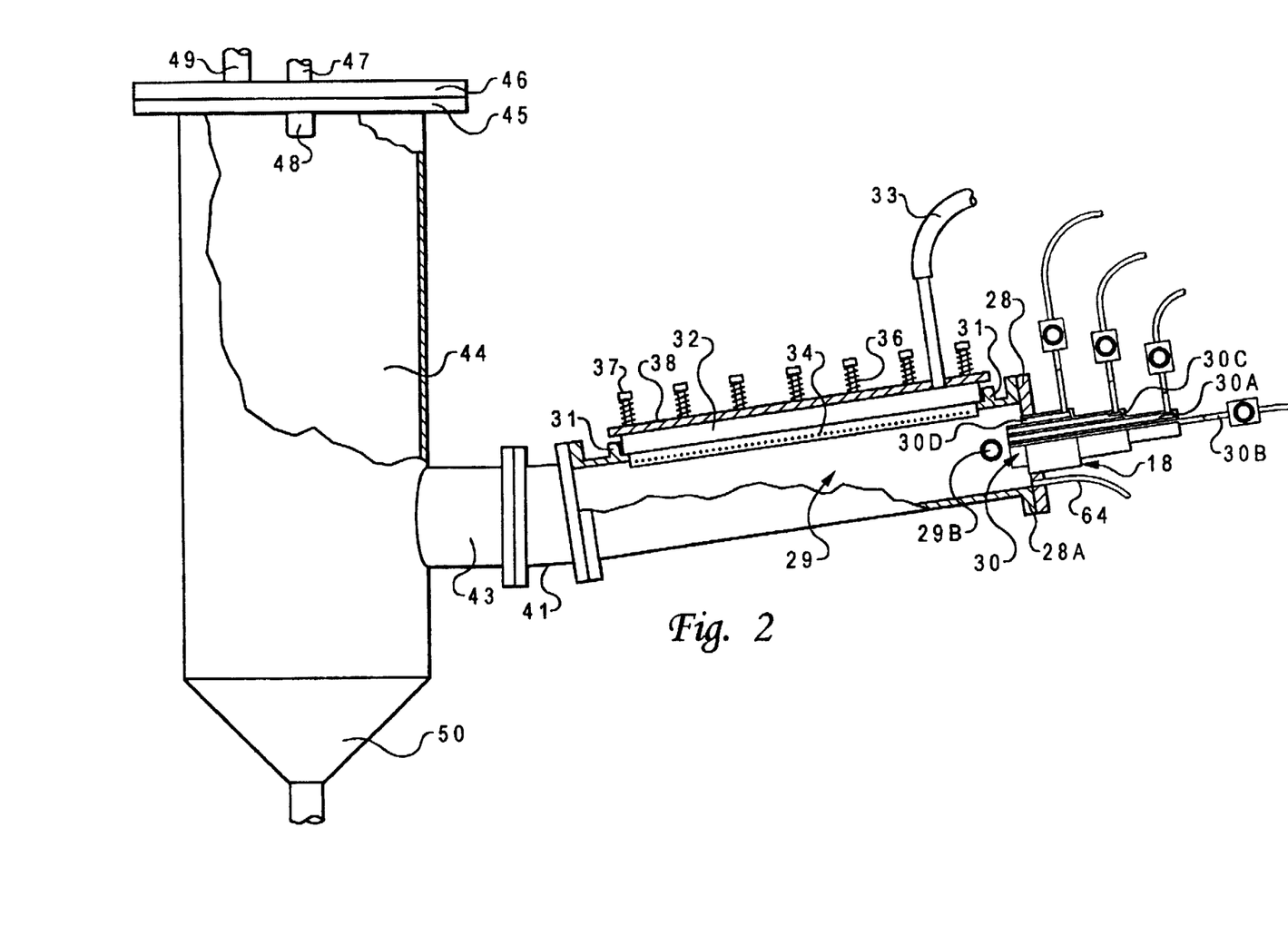
FIG. 2 is a partially sectioned side view of a tube reactor and condenser constructed in accordance with the invention.

The TSG burner (18) is provided with a flange or end cap (28) which couples to a welded flange (28A) formed on the inlet end the combustion reactor tube (29). The end cap (28) is mounted to the flange (28A) by means of bolts or other fastening means. A gasket or other seal should be positioned between the end cap (28) and flange (28A) to so that the reactor tube (29) is atmospherically sealed to prevent the escape or entry of gases or other fluids. An sealable ignition port (29A) is provided in the tube reactor (29) near the burner assembly (18) to allow gases from the burner nozzle (30) to be ignited.

The ideal gas consumption required for use of a TSG burner is determined by the manufacturer. Optimum gas control can be achieved by adjustment of gas flows to achieve the highest flame temperature under all conditions. Measurement of the flame temperature is made by attachment of an infra-red detector (not shown) to a sensor port (29B) that can measure temperatures ranging between about 800° to 5,400° F., temperatures that are encountered by the reaction of hydrogen and oxygen. A suitable detector is the "Wahl Model 303" detector, available from Wahl Instruments, Inc., Culver City, which has provision for attachment of electronics through an RS232 plug. One additional advantage for using an infra-red detector is to enable a signal to shut-off reactant gases in the event of "flame-out" or a low temperature caused by low pressure of reactant gases.

The reactor tube (29) used should have a tube diameter between about 10 to 25% the length of the tube. A suitable reactor tube (29) for processing 20 pounds per hour of HRGs is one having a diameter of 4 inches and a length of 24 inches. The tube (29) is manufactured from coated steel or coated aluminum having a thickness of approximately ¼ inch. Typically, the operating pressure of the tube reactor is less than 15 PSI. The reactor tube (29), however, should have sufficient strength to absorb pressure events much greater than the operating pressure.

The interior of the reactor tube (29) is coated with "Teflon" for corrosion resistance. The tube (29) may be coated by sandblasting the interior of the tube (29) and then applying a powdered coating of "Teflon PFA", available from DuPont in an electrostatic process. The coated parts are then cured in an oven for one hour at a temperature of 750° F.

Figure 3:
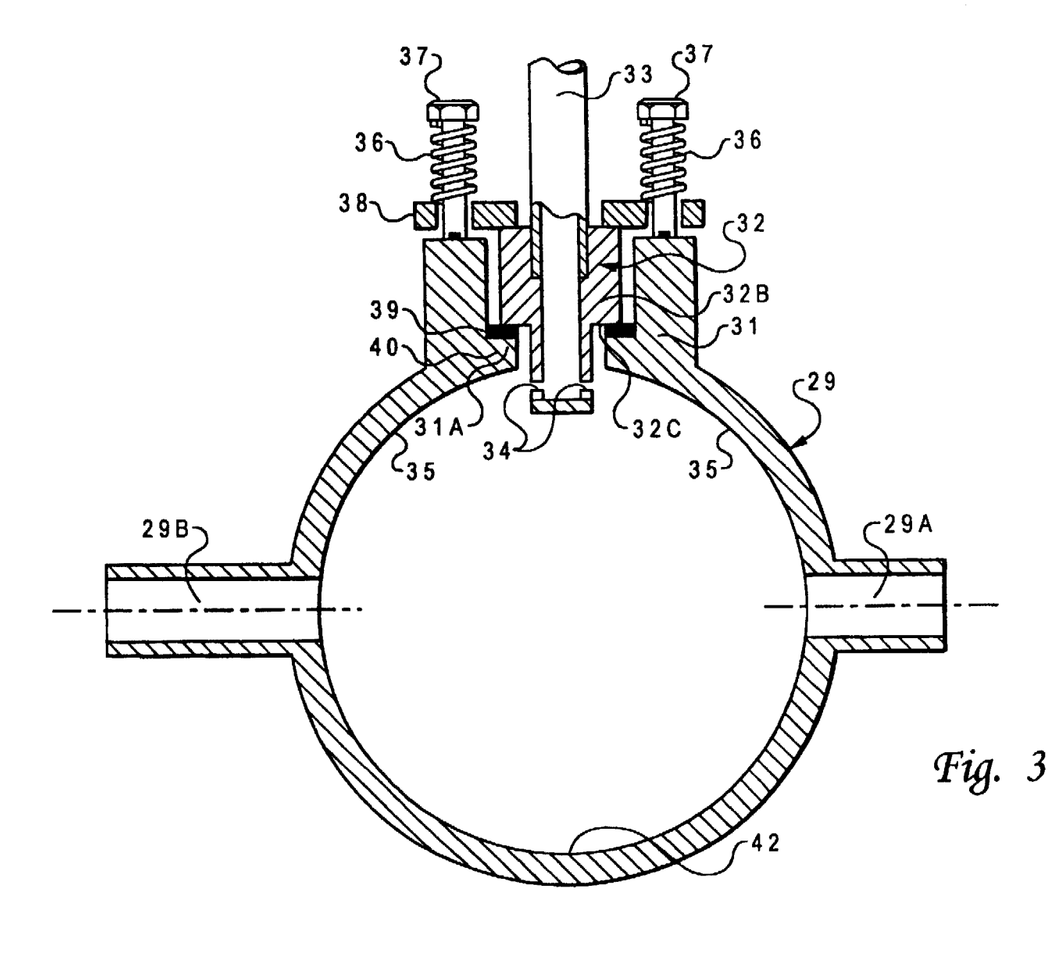
FIG. 3 is a cross-sectional view of the tube reactor of FIG. 2 constructed in accordance with the invention.

The top of the reactor tube (29) has a rectangular spray bar mounting flange (31), shown in FIG. 2 and FIG. 3, which projects upward from the upper exterior surface of the reactor tube (29) and surrounds an elongate opening (31A) formed in the upper sidewall (35) of the reactor tube (29). The opening (31A) extends generally along the length of the upper sidewall.

A spray bar manifold (32) is provided for introducing cooling water into the reaction vessel (29). The spray bar manifold (32) has a lower portion (32A) and an upper portion (32B). The lower portion (32A) projects downward for a selected distance into the interior of the reaction vessel (29) through the opening (31A) when in a closed or extended position. Cooling water or fluid is supplied to the manifold (32) via hose (33). Provided on the lower portion (32A) of the manifold (32) are a plurality of spray-jet orifices (34) oriented to direct cooling water from opposite sides of the lower portion (32A) of the manifold (32). The lower portion (32A) should project far enough into the interior of reactor (29) so that the orifices (34) spray cooling liquid under pressure generally over the entire interior of the upper sidewall (35). In the embodiment shown, there are 150 micro-jet orifices (34) evenly spaced apart and aligned in a row along opposite sides of the lower portion (32A). Each orifice (34) has a diameter of about 0.01 inches. One to two gallons per minute of cooling water are injected through each side of the spray bar (32) through the aligned micro-jets orifices (34).

Outwardly biased springs (36), which are retained in place by bolts (37) threaded into the flange (31), press against a spray bar plate (38) which seats against the upper portion (32B) of the manifold (32). The upper portion (32B) of the manifold (32) defines a lower facing shoulder (32C) which seats against a manifold seat (40) when the manifold (32) is in the closed position. As shown in FIG. 3, the flange (31) is spaced apart from the central opening (31A) with the manifold seat (40) being formed from a portion of the exterior surface of the reactor tube (29) immediately surrounding the central opening (31A). A seal member (39) rests on the manifold seat (40).

The outwardly biased springs (36) press against the spray bar plate (38) to retain the manifold (32) in the closed or extended position wherein the lower portion (32A) of the manifold (32) is fully projected into the interior of the reactor tube (29) with the shoulder (32C) seated against the manifold seat (40) with the seal (39) therebetween to prevent the escape or entry of fluids through the central opening (31A).

In the event of an explosion or high pressure event within the reactor tube (29), the high pressure gases will cause the spray bar manifold (32) to lift, compressing the springs (36) and unseating the shoulder (32C) from the manifold seat (40). This allows gases within the reactor tube (29) to vent through the central opening (31A) into an overhead hood (not shown) and gas scrubber system. The blowout pressure is set at 15 to 25 PSI by equal turns of adjustment bolts (37) and/or by washer spacers to further compress the springs (36).

The outlet end of the combustion reactor tube (29) is connected to an angular flange (41) to a horizontal condenser side inlet branch (43) to which the angular flange (41) is coupled so that reactor tube (29) is oriented at an angle having between 5° to 15° of incline. Approximately 10° is preferred to allow cooling water injected into the tube reactor (29) to flow through the interior of the reactor tube (29) from the inlet end to the outlet end of the reactor tube (29) along the lower sidewall (42) of the tube (29).

The side inlet branch (43) allows fluids from the reactor tube (29) to be introduced into a vertical condenser tower (44). The condenser tower (44) is constructed from steel or aluminum and is also coated with "Teflon." The condenser (44) extends above the inlet (43) a distance substantially equal to the length of the reactor tube (29). The condenser (44) has a diameter sized to allow the free flow of gas products upwards through the condenser (44). A diameter of the condenser (44) that is approximately twice that of the reactor tube (29) has been found to be suitable.

At the top of the condenser tower (44) is a flange (45) to which an end cap (46) is sealed and bolted. The end cap (46) has a connection port (47) for introducing cooling water that is sprayed through a nozzle (48) into the condenser (44) and an outlet (49) for venting non-condensable gases. Below the branch inlet (43) of the condenser tower (44) is a bottom sump (50) for collecting cooling water sprayed into the condenser (44) and carried from the reactor tube (29), including both solid and liquid products.

A condenser pump (51) (FIG. 1) facilitates the removal of liquid products and carried solids from the bottom sump (50). A liquid level control circuit is provided to avoid rapid cycling (hysterysis) of the condenser pump (51) to maintain a proper fluid level in sump (50) to avoid flooding the reactor tube (29). The liquid level control circuit includes a liquid level switch (52) which provides a signal to open a solenoid operated, micro-flow valve (53), to allow a maximum of 0.1 GPM to bypass a manual control valve (54) that is adjusted to maintain a nearly balanced liquid level between incoming cooling fluid and outgoing product fluid removed from sump (50). The bypassed liquid is controlled by a needle valve (55) to obtain a finer adjustment when solenoid valve (53) is open.

The circuit allows the pump (51) to operate continuously to remove products from the sump (50) to a precipitation tank (56) where products from the bottom sump (50) enter the precipitation tank (56) through an inlet or port (57). Preferably, the precipitation tank (56) is a spherical tank which provides a complete enclosure for containment of gases. In the example, the tank (56) has a capacity to store 750 gallons and is manufactured from polyethylene plastic.

The precipitation tank (56) has a second side port (70) which serves as an outlet for connection of a suction line to supply liquid to a cooling pump (58). Both side ports (57) and (70) of the spherical tank (56) are located along the tank equator and have opposite facing elbows on the inside of the tank ports (57) and (70) so that liquid entering the tank (56) through port (57) and passing out of the tank (56) through outlet port (70) causes the tank fluid within the tank (56) to rotate in a clockwise direction, as viewed looking downward from the top of the tank. The rotation causes suspended solid particles removed from the condenser (50) to move close to the tank wall, mixing with tank fluid. Due to gravity and the lower velocity of fluid along the tank wall, suspended particles along the tank wall tend to fall to the bottom of the tank (56) to a bottom outlet (68) before they can be drawn out of the outlet (70) of the precipitation tank (56).

The liquids withdrawn from the tank (56) through outlet port (70) by the cooling pump (58) are filtered by a filter (59). These liquids are used as cooling liquids for cooling the decomposition products of the reactor (29). The filters (59) are sized for accommodating the capacity of the pump (58). A 100 mesh filter should be used to prevent clogging of the jet orifices (34) of the spray manifold (32). The mesh material of the filters (59) should be resistant to mineral acids. A preferred mesh material is polyethylene.

The cooling water or liquid removed from the precipitation tank (56) by means of pump (58) is chilled by a standard tube and bundle heat exchanger (60) after filtration. The heat exchanger (60) should provide enough heat transfer to control the thermal energy produced in the combustion reaction.

The cooling water is transferred through a flow control manifold (61) where a flow control (62) controls cooling fluid delivered to the condenser inlet (47) at 4 to 5 GPM. Flow control (63) controls cooling fluid delivered to the reactor tube (29) spray bar inlet (33) at 1 to 2 GPM. An optional flow control (64) controls cooling fluid delivered to a cooling water jet (65) that is installed beneath the TSG burner (18) to supply cooling fluid at 0.5 to 1 GPM which also helps to remove cooling water injected by the spray bar (32).

A primary filtration system consisting of a liquid product pump (66) and bag filter vessel (67) capable of filtering one micron size particles on a continuous basis. Filtered liquid removed from the bottom outlet (68) of the primary precipitation tank (56) is returned from the outlet of the filter (67) to the side tank outlet (57) through conduit (69).

Deionized water is supplied to the precipitation tank (56), through a storage tank (71) which also fills liquid into a chemical reagent hopper (72) where liquid is pumped into the precipitation tank (56) by the condenser pump (51). According to the reaction (d) above, hydrochloric acid is generated by the reaction of calcium chloride with hydrogen fluoride. Calcium carbonate, manufactured by the process according to (i) above, is added to the precipitation tank in a slurry where it is stored in a tank (73) above the reagent hopper (72). Deionized water from tank (71) is used to wash reagents into the hopper and remove reagent hopper residues. A cover is placed over the hopper (72) to prevent contamination. A side outlet (75) of the reagent hopper (72) provides additional entry for other reactants.

When the combustion reaction is in progress, calcium carbonate is added to the precipitation tank (56), which is stored in reagent chemical tank (73), and drained into the reagent hopper tank (72), pumped by the condenser pump (51) into precipitation tank (56) through inlet (57). Gases are removed by vacuum from a precipitation tank gas outlet (83) and from the condenser gas outlet (49) and carried through conduit (84). A check valve can be installed at the gas outlet (83) to prevent gas at high pressure from entering the precipitation tank.

Figure 4:
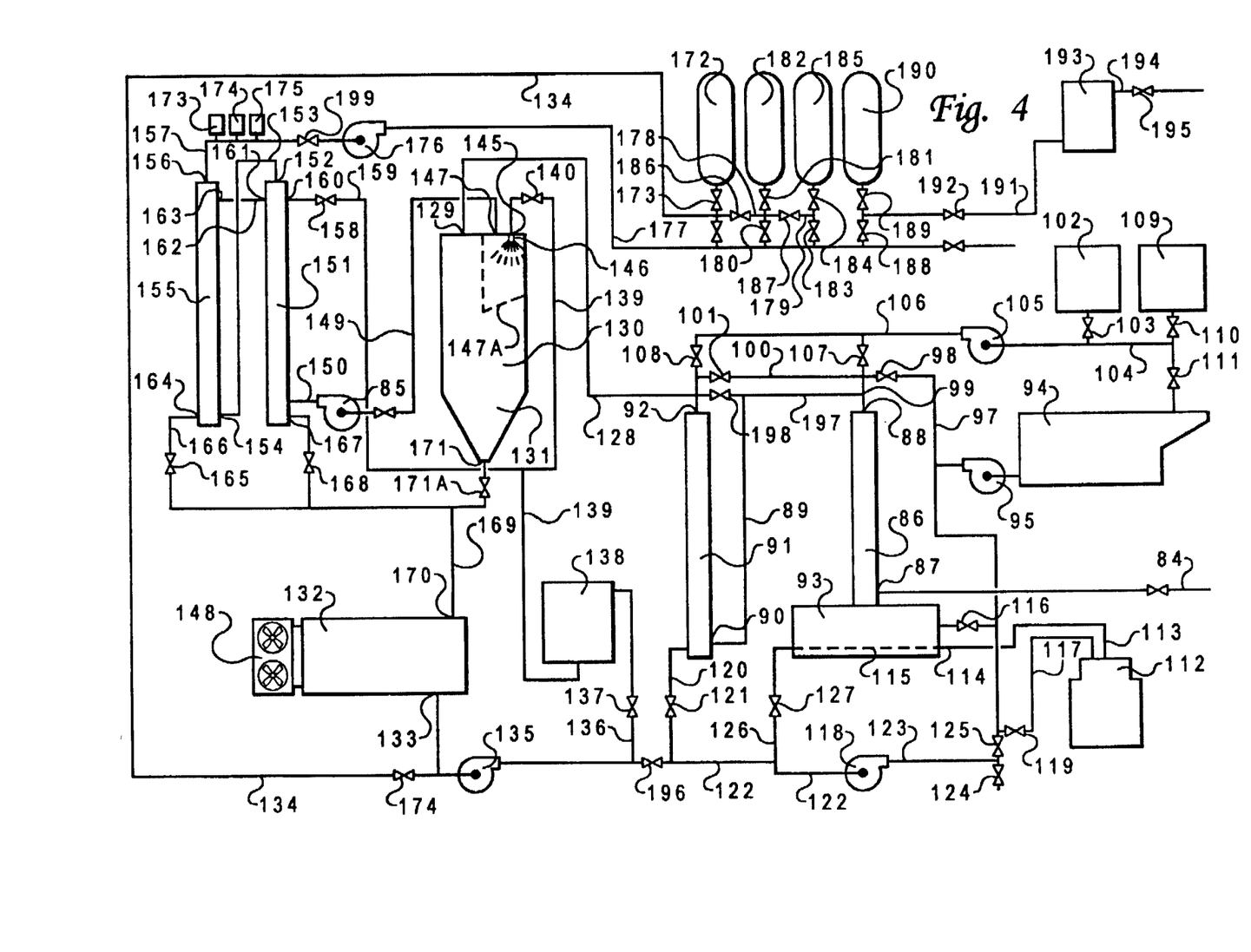
FIG. 4 is a second half and continuation of the plant of FIG. 1 used in carrying out the method of the invention.

A liquid ring vacuum pump (85), shown in FIG. 4, such as model 3804, manufactured by Sihi Pumps, Inc., Grand Island, N.Y., which is satisfactory for the process described. The vacuum pump (85) is driven by a variable speed motor to enable variation of vacuum pressure for different desired pressure conditions.

Control of reactant gases and operation of the vacuum pump (85) may be provided by means of pressure transducers located near the outlet (49) of the condenser (44). A pressure transducer equipped with an RJ232 connection, model PX105-025G5V, manufactured by Omega Engineering, Stamford, Conn., is acceptable for the process described. The pressure transducer can also be used to set the vent pressure of the spray bar (32).

The vacuum pump (85) removes gases from the condenser (44) and precipitation tank (56) via conduit (84) and delivers them into an inlet (87) located near the bottom of a first scrubber (86). Gas is transferred into the inlet (87) and through the scrubber tower (86) to a port (88) located at the top of the scrubber (86). From the port (88), gas passes through conduit (89) to an inlet (90) located near the bottom of a second scrubber (91) and up through the scrubber tower (91) to port (92). The scrubber tower (86) has at its base a scrubber bottoms tank (93) that collects liquid products and serves also as a reaction vessel. In the example described, the gas scrubber towers (86) and (91) are 12 feet tall and 8 inches in diameter. The towers (86), (91) should be manufactured from materials which are resistant to corrosion and that can withstand temperatures between about 220° to 230° F. Suitable materials include either steel or aluminum coated with "Teflon" or plastic materials, such as polypropylene, polyvinylidene fluoride and CPVC. Each of the towers (86), (91) is packed with random packings, such as flexrings. A wide variety of packing materials may be used, but should be resistant to mineral acids and suitable for the temperature range above.

A lime tank (94) is provided for hydrating lime. Lime from the lime tank (94) is pumped by a pump (95) that is connected to conduit (97). Reactants and products entering conduit (97) are transferred to conduit (99) through valve (98) and transferred into the scrubber (86) through port (88). Lime solution is also transferred through conduit (100) and through control valve (101) into the outlet port (92) of scrubber (91).

A 35% hydrogen peroxide solution is stored in a hydrogen peroxide tank (102), which is a standard 55 gallon tank. The hydrogen peroxide is released by valve (103) into conduit (104) and pumped by pump (105) into conduit (106). Valve (107) meters hydrogen peroxide into the inlet (99) in the top of scrubber (86) and by valve (108) into the inlet (92) of scrubber (91). Deionized water is stored in tank (109), where deionized water is released by valve (110) into conduit (104) and into the lime tank to combine with dry lime placed in the lime solution tank (94) through valve (111).

The primary scrubber bottoms tank (93) is heated by steam vented from a solvent evaporator (112). The solvent evaporator (112) should be formed of steel and coated with "Teflon" to resist corrosion. The solvent evaporator (112) can be heated indirectly by an electric heater installed in an oil bath, similar to a "double boiler" arrangement. The solvent evaporator (112) is connected to conduit (113) so that steam passes through conduit (113) into an inlet (114) of the bottoms tank (93). A steam venting pipe (115) is installed at the end of conduit (114), inside bottom tank (93). The steam venting pipe (115) has micro-jet orifices directed to the tank floor of the bottoms tank (93) and sidewalls to mix reactants and products, heat liquid and vent steam into the scrubber tower (91).

A pump (118) removes liquid reactants from the bottom tank (93) and products which are transferred into conduit (126). Reactants and products are transferred through control valve (127) which connects to conduit (122) and enter pump (118) where pumped liquids are transferred to conduit (123) which is connected to conduit (97). Transferred fluid can be removed from bottoms tank (93) and scrubber tower (91) by opening valve (124) in conduit (97) when valve (125) is closed. When valve (124) in conduit (97) is closed and valve (125) is open, products and reactants can be circulated back into bottoms tank (93) through conduit (117) which is connected to conduit (97).

Valve (116) connects conduit (97) to bottoms tank (93). Reactants and products can be circulated back into the tank or be transferred through conduit (97) through control valve (98) and into conduit (99) where bottoms tank products and reactants are mixed with lime solution and hydrogen peroxide in the scrubber (86).

Bottoms tank liquid is pumped by bottoms tank pump (118) into conduit (117) through control valve (119) to fill solvent evaporator (112). Control of valve (119) can be intermittent, to allow overflow of liquids through steam venting conduit (113). In the case where venting of liquid through conduit (113) is appropriate, it is optional but preferable to install a filter at the inlet to conduit (113) to prevent plugging of steam jets. As an option, a liquid level device can be used to open valve (119) when low liquid in solvent evaporator (112) is indicated. The control of the rotation speed of vacuum pump (85) determines vapor pressure and consequently, determines the temperature of the evaporator tank (112) during boiling of calcium chloride solution being condensed.

Control of valve (121) in conduit (120) provides control of the evacuation of scrubber tower (91) bottom fluid which is evacuated by pump (118) into conduit (123). Valve (121) should be open to permit free flow of liquid products transferred from bottom scrubber (91). Valve (121) is closed only when products are transferred from a chiller tank (132) described below. Gas that is removed from scrubber tower (91) through the bottom outlet into conduit (120) will eventually be vented through scrubber (86) and travel to the outlet (92) of scrubber tower (91).

Product gas, which has been scrubbed to remove nearly all hydrogen chloride, is removed by the vacuum pump (85) and transferred to conduit (128) into inlet port (129) located at the top of a condenser (130). The condenser (130) is an enclosed vessel formed of steel that has been coated on the inside with "Teflon." The condenser (130) has a conical sump (131) at its base. A liquid inlet port (145), for introducing cooling fluid from the chiller tank (132), and gas outlet port (147) are located in the upper portion of the condenser (130). An internal shroud (147A) surrounds the ports (145), (147) and extends downward for a selected distance from the top of the condenser (130) and is open at the bottom so that gas introduced into the condenser (130) through the port (129) may pass upward through the shroud (147A) to the port (147).

The chiller tank (132) is formed from an appropriate material, such as polyethylene, and stores calcium chloride solution which outlets at chiller tank outlet port (133) into conduit (134) where pump (135) circulates chilled fluid through conduit (136) when valve (196) is closed and when valve (137) is opened. Valve (137) is closed when filter bags in filter (138) are removed when collecting precipitated calcium carbonate. Filtered cooling fluid is pumped into conduit (139) past control valve (140) and into condenser (130) through the cooling liquid inlet port (145). A full spray nozzle (146), similar to the full spray nozzle (48) used in condenser (44) injects pumped cooling fluid against upcoming gas which exits condenser (130) at outlet (147). Cooling of chiller tank (132) is by a standard refrigeration system (148) having the capacity to remove 50,000 BTUs per hour and chill calcium chloride solution to a temperature of 24° F.

Gas products passed through condenser (130) gas outlet (147) are transferred into conduit (149) and through an inlet (150) located at the base of a vertical carbonator tower (151), bubbled upwards through the tower to outlet (152) into conduit (153) and gas is transferred into inlet (154) at the base of a second vertical carbonator tower (155) and outlet (156) into conduit (157). It should be noted that more carbonation towers may be added to efficiently process carbon dioxide gas. The carbonator towers (151), (155) may be constructed of the same materials as the scrubbers (86), (91). The carbonator towers (151), (155) are filled with chilled fluid from chiller tank (132) when control valve (140) in conduit (139) is closed and control valve (158) in conduit (159) is opened. Chilled liquid is transferred by pump (135) into carbonator tower (151) at inlet (160), and overflows to outlet (161) through conduit (162) into carbonator (155) at inlet (163). Liquid is drained from the carbonator tower (155) at the base by liquid outlet port (164) through control valve (165) into conduit (166). Liquid is also drained from the base of carbonator (151) through liquid outlet port (167) through valve (168) into conduit (166) which connects into conduit (169) and transfers liquid back into chiller tank port (170).

Cooling fluid and precipitated calcium carbonate are removed from condenser (130) at a sump outlet (171) of the sump (131) into conduit (169) through valve (171A). The chiller tank (132) is sealed and entirely flooded, leaving no gas space. Optionally, the chiller (132) can have a gas space if the liquid level is equal to the liquid levels of the condenser (130) and carbonator towers (151) and (155). Operation of the vacuum pump (85) as a blower enables gas products to be percolated through liquid in carbonators (151) and (155).

Ammonia gas, stored in tank (172) and vented by control valve (173) from the tank (172) into conduit (134), enters the chiller tank pump (135) and mixes with chilled calcium chloride solution from the chiller tank (132). After closing the control valve (199) located at the inlet of compressor (176), hydration of ammonia gas occurs when it is combined with chilled calcium chloride solution pumped from the chiller tank (132). The optimum pH of about 7.5 is required for the efficient precipitation of calcium carbonate and is monitored at the bottom outlet (171) of the condenser tank (130).

Chilled gas products, mainly oxygen and carbon dioxide, are transferred through the conduit (157) where they are monitored by gas analyzers, such as those available from INTEC, La Jolla, Calif., for chlorine (173), carbon dioxide (174) and oxygen (175) before entering primary compressor (176) and transferred into conduit (177). Compressed gases are diverted through either conduit (178) or (179) where control valve (180) and isolation valve (181) permits gas to be compressed into holding tank (182) or control valve (183) and isolation valve (184) permits gas to be vented into tank (185).

When more efficient scrubbing of carbon dioxide is desired, gas products are first compressed into tank (182). As gas is compressed into tank (185), gas products first compressed and stored in tank (182) can be released back into conduit (134) by opening isolation valve (181) and control valve (186), and closing valve (187) in conduit (179) to release gas into conduit (134). This allows gas products to be scrubbed a second time by being transferred through condenser (130) and carbonation towers (151) and (155). Scrubbed gas is returned to tank (185) or to final oxygen storage tank (190) by the compressor (176). Chilling of gases in condenser (130) and carbonator towers (151) and (155) in the neighborhood of 30° F. provides efficiency of compression of gases by lowering compressor (176) gas inlet pressure.

A third scrubbing sequence is provided when gas is transferred by compressor (176) to storage tank (185). Recycling of gas occurs when valve (184) is opened and valve (183) is closed, and valves (181) and (186) are opened to vent tank products into conduit (134). Compressed gas can be stored in tank (190) during the process when compressed gas is transferred through conduit (177) and valves (188) and (189) are opened.

During the carbonation process, gas stored in both tanks, (182) and (185) can be scrubbed at the same time. Additional ammonia gas, stored in tank (172) can be released into conduit (134) when required by opening valve (173) at the same time gas products are being scrubbed that are stored in tanks (182) and (185).

When scrubbing of carbon dioxide is completed, compressed gas transferred through conduit (177) is vented through control valve (188) and isolation valve (189) into oxygen storage tank (190). Oxygen released for use in the combustion reaction is first scrubbed by venting into a scrubber tower (193) where dilute hydrochloric acid removes trace ammonia gas. This prevents carryover of ammonia gas into the combustion reaction. After scrubbing to remove trace ammonia gas, oxygen is transferred to conduit (194) and through control valve (195) into junction (22), shown in FIG. 1, for use in the combustion reactions.

The process for transforming halogenated refrigerant gases using the process equipment described above is as follows. Oxygen and hydrogen gas from storage tanks (1) and (2), steam from steam boiler (10), and either liquid or powdered high-purity calcium chloride from dispenser (25) are injected simultaneously into the reactor (29) by means of the burner assembly (18), previously described. The reactants are initially ignited by means of ignition port (29A) in the tube reactor (29).

The hydrogen and oxygen used in the combustion reaction may be generated by electrolysis for use in the combustion reaction. Industrial equipment for the production of hydrogen and oxygen by electrolysis is widely available or can be easily fabricated. When hydrogen and oxygen are prepared by electrolysis, high-purity calcium chloride is added to ionize water that has previously been deionized.

High-purity calcium chloride is supplied either as a powder or solution. A trade-off is made when liquid solution is injected, since the thermal energy supplied by hydrogen and oxygen manufactured by electrolysis is more expensive for evaporation of water in a solution. There are less expensive forms of thermal energy available to dry high-purity calcium chloride first produced in a water solution by the process and injected into the reactor tube after sufficient drying. It should be noted that while calcium chloride is preferred as the calcium reagent, high purity calcium hydroxide, calcium oxide and calcium carbonate can also be used.

The preferred temperature for thermal transformation of HRGs and halons is above 3,500° F., although one example of efficient thermal destruction of CFC-113 was conducted at 2,300° F. When too low a heat is applied for combustion, there can be incomplete oxidation of carbon contained in HRGs and halons. Operation of combustion at too low a temperature can permit the formation of incomplete reaction products which can result in the production of very toxic compounds. These reaction products are not typically formed when copper is not a contaminant in either the reactant gases or when copper does not come in contact with reactants during operation of the process. Avoidance of toxic by-products is also enhanced by the high temperature of combustion followed by rapid cooling of gas products.

Steam, injected through the cooling gas ring (30D), is not only a reactant according to reaction (c) above, but serves to protect the components of burner (18) from corrosive reaction products. To prevent steam from cooling the reaction products during combustion, the orifice ring (30D) is adjusted for a wide pattern, which also supports the use of steam to prevent backwash of product gases which may cause damage to the burner assembly (18). It is not practical to coat the burner assembly parts with Teflon.

During the first part of the combustion reaction, HRGs or halons, oxygen to react with carbon contained in HRGs or halons and high-purity calcium chloride, are simultaneously injected into the core of the flame, similar to the case when a TSG is used to coat an object with thermally melted metal or plastic powder. The thermal reaction which occurs in an atmosphere of surplus oxygen, oxidizes carbon contained in HRGs or halons to first form carbon dioxide. This reaction occurs in the central portion of the high temperature gas stream as high-temperature gas products travel through the reactor tube (29) as a result of the intense radiant heat from the combustion of the surrounding hydrogen and oxygen gases.

A second step in the reaction occurs when the heated particles of calcium chloride, produced carbon dioxide and free monatomic chlorine and fluorine combine with monatomic hydrogen and oxygen produced by combustion of hydrogen and oxygen gas. Monatomic fluorine immediately combines with free hydrogen to form hydrogen fluoride and subsequently reacts with melted calcium chloride that has disassociated and that readily reacts with hydrogen fluoride to form calcium fluoride. A small fraction of the reaction products will be cooled and immediately precipitated in the cooling water supplied to the sidewalls of the reactor (29), described below. The remaining decomposition products and the precipitated calcium fluoride are cooled immediately by cooling water injected through the spray nozzle (48) into the condenser (44) to which the tube reactor (29) is attached at the flange (41).

Radiant heat produced by the reaction can be absorbed by the tube reactor side walls (35), shown in FIG. 3. Cooling of the side walls is necessary and is accomplished by the injection of cooling water into the tube reactor (29) by the rectangular shaped spray bar assembly (33), previously discussed. Aqueous cooling liquid from the spray jet orifices (34) produces a sheet of water flow that not only cools the interior sidewalls of the reactor tube (29), but also washes away calcium fluoride other particles produced by the reaction which may have splattered onto the sidewalls of the reactor tube (29. The accumulation of both produced calcium fluoride and unreacted calcium chloride that has been splattered on the side walls, if allowed to remain, can reduce thermal heat transfer due to radiant heat that is absorbed by the reactor tube (29). The injection of cooling water through the high-velocity jets orifices (34) also scours and washes any solid particles from the sidewalls onto the inclined floor (42) of the tube reactor (29) where it is washed away to the condenser (44) in an aqueous liquid phase.

A third stage of the reaction occurs when chlorine gas and hydrogen chloride, produced by the reaction of calcium chloride and hydrogen fluoride, shown by reaction (c) above, are produced. Hydrogen chloride is then condensed and dissolved in the cooling water and chlorine gas escapes from the condenser (44) at the outlet (49) along with carbon dioxide and excess unreacted oxygen. The cooling water carrying the condensed products along with precipitated calcium fluoride and unreacted calcium chloride particles are collected in the bottom sump (50) of the condenser (44) and carried by means of condenser pump (51) to the precipitation tank (56).

The aqueous liquid used as the cooling fluid supplied to the combustion tube reactor (29) and condenser (44) is provided from the precipitation tank (56) where it is pumped from one side port (70) by means of the pump (58). The cooling fluid removed from the precipitation tank (56) is first filtered through the liquid filters (59). Preferably, at least two filters are used to allow for continual backwashing by alternating between filters. Backwashing is preferred to remove captured solids and to prevent interruption of the filtering process during operation. The backwashed particles may be reintroduced into the tank (56) through side port (57).

The heat exchanger (60), located downstream of the filters (59), controls the thermal energy produced in the combustion reaction. Filtered cooling liquid from the tank port (70) is passed through the heat exchanger (60) where the cooling liquid for condenser (44) and reactor tube (29) should be cooled to a temperature of approximately 50° F. Some reaction heat can be removed by direct radiation of the combustion tube (29), the condenser (44) and the precipitation tank (56). A preferred temperature of 125° F. should be maintained within the precipitation tank (56) to enhance the rate of precipitation tank reactions. Optional cooling liquid from the coolant pump (58) can be provided to the tank port (57) in the event that temperatures in the tank (56) rise above 125° F.

The heat exchanger (60) is provided with chilled calcium chloride solution as a coolant. The chilled calcium chloride solution, which is manufactured by the process, is first chilled in the refrigerated chiller tank (132), shown in FIG. 4. The chilled calcium chloride solution is circulated by pump (135) from the cooling tank (132), through the cooling fluid heat exchanger (60), and back to the chiller tank (132) where it is cooled again. Calcium chloride solutions, typically used as an antifreeze, provide an excellent heat transfer fluid for the process described as they can be chilled below the freezing point of water, for example, 24° F.

A slurry of high-purity calcium carbonate is quantitatively injected into the precipitation tank (56), shown in FIG. 1, as a reactant for neutralizing the liquid removed from the condenser (44). Optionally, a pH meter is installed near the bottom outlet (68) of the precipitation tank (56) to monitor pH for the control of the calcium carbonate injection. A pH of 6.0 is desired to assure the complete reaction of injected calcium carbonate and avoid contamination of precipitated high-purity calcium fluoride with precipitated calcium carbonate. Rotation of the tank liquid as previously discussed, when calcium carbonate is injected into the side inlet (57) of the precipitation tank (56), helps to mix the reactants and to enhance the reaction between calcium carbonate and dilute acid in the tank (56).

Calcium carbonate slurry is dispensed from the reagent storage tank (73) above the reagent hopper (72). Micro-fine particles of precipitated, high-purity calcium carbonate, produced at a later stage in the process, react with hydrochloric acid produced in the reactor tube (29) and in the condenser (44) to produce calcium chloride and carbon dioxide according to (f). Carbon dioxide gas bubbles produced by the reaction of calcium carbonate with acids help to remove chlorine gas and in the case of halons, bromine gas, that has been absorbed by the cooling water removed from the reactor tube (29) and the condenser (44).

Continuous operation of a pump (66) removes precipitated calcium fluoride from the precipitation tank, where pumped liquid is passed through a standard filter bag vessel (67). Reusable filter bags are provided to collect precipitated solids that are about one micron in size. When calcium carbonate is captured in the filter bags, the constant washing through the filter bags of tank liquid provides continued reaction of calcium carbonate with tank acids. If necessary, precipitated calcium fluoride can be first washed with a dilute solution of deionized water and dilute hydrofluoric acid, produced in the combustion reaction by the suspension of calcium chloride injection, to remove unreacted calcium carbonate from the precipitation tank (56) and filters. Dilute hydrofluoric acid completely removes and replaces carbonate in particles of calcium carbonate. Following, filtered high-purity calcium fluoride is washed with deionized water that is returned back into the precipitation tank (56) and precipitated calcium fluoride is removed from the filter bag of the filter vessel (67) and dried for commercial uses.

Non-condensable gases, which include chlorine gas, excess oxygen, carbon dioxide, and bromine gas in the case of halon transformation, are removed from the condenser (44) through the gas outlet (49). Carbon dioxide gas as well as any chlorine or excess oxygen gas are also removed from the precipitation tank (56) through the gas outlet port (88).

Removal of gas products is provided by the liquid ring vacuum pump (85), shown in FIG. 4. During the reaction process, gas product pressures change according to temperatures of various reactors, scrubbers and condensers. The operating pressure of the reactor tube (29) is required to propel reactants and products through the reaction vessels and connected conduits, shown in FIG. 1 and FIG. 4, to the inlet of the vacuum pump (85). When the precipitation tank (56) is manufactured from plastic material, pressures must be controlled by the vacuum pump (85) to prevent expansion.

Condenser (44) and precipitation tank (56) gas products are passed through the first scrubber tower (86) to the outlet (88) and into the bottom of the second scrubber (90) above the first scrubber bottomstank (93). Product gases transferred through the first scrubber tower (86) are treated by a solution of slaked lime from lime tank (94) and 35% hydrogen peroxide from tank (102). The solutions of lime (calcium hydroxide) and hydrogen peroxide are injected at the top of the first scrubber (86) through the gas outlet port (88). The lime and hydrogen peroxide solution percolates through the packing material in the scrubber tower (86) and is collected in the bottoms tank (93). By varying the ratio of lime and hydrogen peroxide to maintain a pH of about 8.4, it is possible to optimize the production of calcium chloride while minimizing precipitation of lime and lime scale on packing and scrubber tower (86) sidewalls. From equation (g), the reaction of hydrogen peroxide with chlorine gas produces oxygen and hydrochloric acid. The hydrochloric acid reacts immediately with lime to produce calcium chloride according to (h).

Steam from the solvent evaporator (112) is injected into the first scrubber (86) bottoms tank (93) through the multiple jet manifold (115). Steam helps to maintain a proper temperature of the bottoms tank fluid, drives off trapped chlorine gas, mixes bottoms liquid and provides additional gas for proper function of the scrubber towers (86) and (91). The optimum rate of flow for gases upwards through the scrubber towers (86) and (91) and downfalling scrubber liquid is determined by the packing used and recommendations of the packing manufacturer.

The second scrubber (91) is similar to the first in operation with hydrogen peroxide and lime solution being injected into the port of the gas outlet (92) of the second scrubber (91). The reduced chlorine gas concentration, however, is scrubbed by a higher concentration of hydrogen peroxide blended with a more dilute solution of calcium hydroxide. The amount of reactants are adjusted to maintain a pH of about 8.4 in the bottom of the scrubber (91).

Liquid products are captured near the bottom gas inlet (90) of the second scrubber tower (91) and continuously evacuated by the first scrubber bottoms tank pump (118). The produced solution of raw calcium chloride (to distinguish from high-purity calcium chloride) is pumped from the bottoms tank (93) of the first scrubber (86) and from the bottom of scrubber (91) into the solvent evaporator (112) which produces steam for injection into the bottoms tank (93). An optional reserve tank (not shown) can be used when it is desirable to evacuate all liquid in the process, such as when ammonia chloride is recovered, as described below. Optionally, a reserve tank can be installed to increase the capacity of the bottoms tank (93).

The vacuum pressure can be adjusted to reduce the temperature of boiling liquid (water) in the solvent evaporator (112) which is vented into the first scrubber bottoms tank (93). Adjustment of vacuum pressure is achieved to maintain a low pressure measured by a pressure transducer (not shown) located near the gas outlet (92) of the second scrubber (91). The use of the solvent evaporator (112) provides a compact, modular system for heating and concentrating calcium chloride solution and for providing the steam and heat necessary for reactions that take place in the bottoms tank (93) and scrubber towers (86) and (91). The solvent evaporator (112) is a sealed tank. Circulating fluid removed from the bottoms tank (93) and from the second scrubber tower (91), can be transferred to the solvent evaporator (112), the top of the scrubber (86), or the bottoms tank (93). As steam escapes from the solvent evaporator (112) through conduit (113), circulated liquid can replace evaporated liquid through conduit (117) at the same time liquid is being circulated into the bottoms tank (93) through conduit (116).

Carbon dioxide and oxygen gases, scrubbed to remove chlorine gas, are removed by the vacuum pump (85) from the second scrubber tower outlet (92) and passed through the second condenser (130) where recovery of carbon dioxide is begun. Gas passing out of the condenser (130) must first enter the shroud pipe (147A) and when cooling solution is sprayed into the pipe (147A) by a full spray nozzle (146), efficient heat exchange occurs before gases pass out of the condenser (130). At the same time, the condenser (130) defines a large gas expansion chamber below the inlet (129) which allows mixing of trace chlorine gas not removed in the second scrubber tower (91) to mix with ammonia gas which is injected into the condenser (130) from the ammonia tank (172). The ammonia is first passed into the chiller tank pump (135) and transferred along with calcium chloride solution chiller liquid into the liquid inlet port (145) of the condenser (130).

The condenser (130) provides an environment for ammonia gas to react with hydrogen chloride, produced in scrubber towers (86) and (91), to produce ammonium chloride, and also an environment that allows for the condensation and cooling of steam mixed with carbon dioxide and oxygen from the scrubbers (86) and (91).

It is preferable to maintain equal liquid levels in the various reaction vessels, i.e. the chiller tank (132), the condenser (130) and carbonation towers (151) and (155). This requires that the towers (151) and (155), the tallest vessels, be mounted lower than the chiller tank (132). The liquid level in the condenser (130) is the preferred liquid level maintained in the sump (131). Optionally, the chiller tank (132) and the condenser(130) can be mounted on stands to accommodate the height of the carbonator towers (151) and (155) so that the liquid levels in all reaction vessels are all equal with respect to the horizon. This feature allows the pump (135) to circulate chiller tank liquid through all identified vessels to while the carbonation process is ongoing or the system is evacuated for recovery of ammonia chloride.

The chiller tank (132) is not only a storage tank for reactants used for the scrubbing of carbon dioxide, but also a cooling system for cooling heated gases. Chilling of high-purity calcium chloride solution or high-purity calcium chloride mixed with other salts while the carbonation process is ongoing, provides an opportunity to use the chilled liquid for other cooling processes, because calcium chloride solution is an excellent chilling liquid.

The chilled cooling solution is pumped from the chiller tank (132) by the chiller tank pump (135) to the inlet (145) of the scrubber condenser (130) and returned to the chiller tank by gravity from the condenser sump (131) bottom outlet (171). The equalization of the sump (131) liquid level with the chiller tank (132) liquid level prevents overflow or underflow of liquids in both vessels.

Ammonia gas, stored in the ammonia tank (172) with a control valve (173), is vented under pressure into the inlet of the chiller tank pump (135) via conduit (134). Chilled, purified calcium chloride solution released from the chiller tank outlet (133) is pumped by chiller tank pump (135) and is injected into the scrubber condenser (130) at the liquid inlet port (145). When ammonia is vented into the cooling tank pump (135) and the condenser (130) at the liquid inlet (145), a constant gas pressure is maintained. At the time ammonia gas is being added to the system, the control valve (199) located at the inlet of compressor (176) is closed. By opening valve (158) in the conduit (159), calcium chloride that has been placed in the carbonation towers (151) and (155) is circulated to absorb ammonia gas. When ammonia saturation of calcium chloride solution has been completed, ammonia venting into the condenser (130) is discontinued.

Injection of carbon dioxide further reduces the gas pressure due to the reaction with ammonia. More ammonia can be added along with carbon dioxide, while a pH near 7.5 is maintained, until there is a high concentration of ammonia chloride in solution. The production of precipitated calcium carbonate and ammonium chloride according to (i) reduces the gas pressure of both ammonia and carbon dioxide. The gas control valve (199) is opened and the compressor (176) is started during carbonation, to remove gases that are not scrubbed.

Product gas is passed from the condenser outlet (147) to the inlet of the liquid ring pump (85) and is blown from the outlet of the pump through one or more of the carbonation towers described. The rate of carbon dioxide recovery can be increased when additional carbonation towers are added to the system. After passing from the outlet of the final carbonation tower (156), product gas may still be composed of a mixture of carbon dioxide and oxygen with some ammonia gas. Orientation of storage tanks and connections can provide for recycling of produced gas until the oxygen content is high enough for use in the combustion reactor. The venting of product gas, for example, that has already been compressed and stored in tank (182), can be ongoing into conduit (134), while gas is compressed by compressor (176) into conduit (177) and into either the final oxygen storage tank (190) or a second gas storage tank (185).

Cooling solution, constantly circulated by the chiller pump (135), is pumped into the top of the carbonation towers (151), (155). Draining of the carbonation towers (151) and (155) into the chiller tank (132) where the chiller tank liquid is constantly pumped through the filter (138), provides a method for harvesting precipitated high purity calcium carbonate. Produced, high-purity calcium carbonate is filtered by a bag filter vessel (138) similar to the bag filter vessel (67). The filtered product is washed with deionized water in the bag filter and removed. The calcium carbonate captured in the bag filter can be dried for other commercial uses or used to supply calcium carbonate to the primary precipitation tank (56) through the reagent chemical tank (73), shown in FIG. 1.

The scrubbing of carbon dioxide with ammonia results in trace contamination of recycled and produced oxygen with ammonia. This occurs when ammonia gas, used to precipitate calcium carbonate according to reaction (i) above, is not removed entirely during the carbonation process. Trace ammonia gas is removed by use of dilute hydrochloric acid. The hydrochloric acid scrubber (193) is designed to withstand the low pressure required to inject oxygen into the combustion reaction (a). Removal of trace ammonia gas provides the last step to assure the ability to continuously recycle all gas products without venting. Removal of ammonium chloride produced by the scrubbing of ammonia gas with hydrochloric acid is accomplished at the same time ammonium chloride, produced by the scrubbing of carbon dioxide, is reclaimed as described below.

The continuous reaction of ammonia with calcium chloride produces ammonium chloride, which replaces calcium chloride being circulated in the chiller tank (132). As the concentration of ammonium chloride increases, the scrubbing efficiency of carbon dioxide is reduced. Ammonia gas is added to the scrubber condenser as it is taken up by the production of ammonium chloride when calcium carbonate is produced. A similar reaction occurs with calcium bromide.

At a point in time, ammonia gas can be removed from ammonium chloride, which is converted to additional raw calcium chloride, by a heated reaction with lime. At the time ammonia is recovered, the combustion reaction is suspended and a concentrated lime solution is prepared in the lime tank (94), using dry lime and deionized water supplied by the deionized water tank (109). The lime solution should be a slurry where a known concentration of lime, for example, a solution of 25% lime (milk of lime) is added by weight to deionized water and pumped into the scrubber tower bottoms tank (93) so that there is a stoichiometric quantity of lime in the bottoms tank (93) according to the reaction (j) above.

It is preferable to analyze the amount of ammonia chloride in the chiller tank fluid being processed. A preparation of Nessler's reagent, described in Vanselow, A. P., "Preparation of Nessler's Reagent," Ind. Eng. Chem., Anal. Ed. 12:516–517, can be used to determine aliquots of mixed calcium chloride and ammonium chloride, where the test for ammonium ion results in determination of ammonia chloride. A simple colormetric procedure can be set up to make frequent checks of the rising ammonium chloride concentration during operation of the process to transform HRGs and halons by using prepared colormetric standards and an optical spectrometer.

The proper ratios of lime and the mixed solution of calcium chloride and ammonium chloride recovered from the chiller tank (132) and connected carbonator system are pumped by pump (135) and mixed together in bottoms tank (93). Excess calcium chloride and ammonia solution can be stored in a reserve tank (not shown). Reserved, purified calcium chloride solution is pumped into the chiller tank (132) prior to recycling of ammonia, where washing to remove traces of residual ammonium chloride mixed with purified calcium chloride is unnecessary.

The mixture of calcium chloride, ammonium chloride and lime solutions are circulated through the bottoms tank (93) and the solvent evaporator (112) by the bottom tank pump (118). Ammonia gas produced according to reaction (j) is removed in the bottom tank (93) as steam causes the tank bottoms to mix lime with the heated ammonium chloride and calcium chloride solutions. Steam is passed upwards through the first scrubber tower (84), the scrubber tower outlet (88) and through a bypass (197) into the junction of the outlet (92) of the second scrubber tower (91). Gas products are transferred directly into the inlet (129) of the condenser (130), where the hot gases, steam and ammonia, are condensed by the pumping of chilled calcium chloride from the chiller tank (132) through the condenser liquid inlet (145). The chilled calcium chloride solution is ammoniated by the process and again prepared for the scrubbing of carbon dioxide.

A more efficient process, where multiple use of reaction vessels is appropriate for use in a system that is not required to be compact, is provided when an additional reaction system for ammonium chloride recovery is installed. The transformation process, in this case, can be operated on a continuous basis and ammonium chloride and calcium chloride can be continuously processed and added back to the chiller tank (132) and circulated through the condenser (130) and connected carbonator towers (151) and (155) to maintain a low level of ammonium chloride at all times.

At a point when the ammonia reclamation process is complete, the produced calcium chloride solution remaining in the bottoms tank (93), free of ammonium chloride, is filtered to remove excess lime and the produced, reclaimed, raw calcium chloride solution is reserved for later purification following the addition of lime.

Raw calcium chloride solution, removed from the first scrubber bottom tank (93) as a result of scrubbing chlorine gas or conversion of ammonium chloride to calcium chloride, must be purified for use to manufacture high-purity calcium fluoride and calcium carbonate. Purification can take place after removal of all liquid products stored in the primary precipitation tank (56) and washing with deionized water to remove precipitated calcium fluoride and calcium carbonate.

Purification of calcium chloride is required each time calcium chloride is used as a feedstock to precipitate high-purity calcium fluoride or high-purity calcium carbonate, described above. Purification of a 400 gallon batch of raw calcium chloride solution is described below.

The process for purification begins when a 400 gallon batch of raw calcium chloride solution, having an ideal concentration of 27% calcium chloride by weight to water achieved by evaporation or dilution with deionized water, is placed in the precipitation tank (56). Previous products and reactants must be removed to a storage tank and the process vessels washed with deionized water. Slaked lime is pumped from the lime tank (94) by the lime pump (95) from the connected outlet (124) into the reagent hopper (72), shown in FIG. 1, through inlet (75). The lime solution is transferred from the reagent hopper (72) to the precipitation tank (56) by the condenser pump (51) to the tank inlet (57).

The quantity of lime used is determined by the concentration of lime to be reacted quantitatively to remove magnesium, determined by assay. Excess lime and magnesium hydroxide is first filtered by the filter vessel (67) and later by a sub-micron filter canister (82) equipped with a 0.45 micron cartridge filter or optionally, a filter press using 0.45 micron filter pads. The lime recovered is reserved for later processing with metallic sulfides recovered in a further purification step described below.

The filtered solution returned to the precipitation tank is analyzed for magnesium, which must not be greater than 250 parts per million (PPM) magnesium. After the magnesium is removed, 900 ml of ammonium polysulfide solution is added to the reagent hopper (72). The reagent chemical tank (73) is filled with ammonium polysulfide solution in preparation for the purification process. A mixture of ammonium polysulfide solution and deionized water is added to the reagent hopper (72) and transferred to the precipitation tank (56) by the condenser pump (58). The tank reactants are mixed by pumping the products from the outlet (68) of the precipitation tank by the pump (66) through the filter (67) for about one hour.

The temperature of the precipitation tank liquid should be maintained at 160° F., where heating of the tank liquid can be provided by use of the steam boiler (10) that is vented into the combustion chamber when cooling fluid from the precipitation tank (56) is circulated through the condenser (44). The reaction should progress for a minimum of one hour and following, product is pumped through the sub-micron filter (82) to remove the last trace metallic sulfides. Following assay of the product, the processes are repeated until there is less than the following quantities of transition and alkaline metals precipitated as hydroxides or sulfides confirmed by assay:

Aluminum . . . 40 PPM

Barium . . . 100 PPM

Copper . . . 10 PPM

Chromium . . . 20 PPM

Heavy Metals as Pb . . . 20 PPM

Iron . . . 15 PPM

Magnesium . . . 50 PPM

Nickel . . . 30 PPM

Silicon . . . 100 PPM

Sodium . . . 100 PPM

Strontium . . . 500 PPM

It is with reference to these amounts of trace elements that the term "high purity" is used. Products containing only traces of these elements which are less than the amounts listed above are considered to be high purity and suitable for the applications described herein.

The purification of calcium chloride to remove silica is accomplished by filtration, which removes any sand particles carried through from lime, where sand particles tend to be coarser than 0.45 microns. The removal of sodium can be accomplished by washing slaked lime with deionized water if sodium exists as an impurity other than as tied up in clay particles. Clay particles carried through the process by lime are removed by filtration at 0.45 microns. Codex lime usually meets the specification for a lime source to manufacture high-purity calcium chloride by the process and is available from many suppliers such as US Gypsum, Chicago, Ill. as Kemical Codex Hydrate and Chemstar Lime, Ft. Worth, Tex. as Type N Hydrate.

Preparation of high-purity ammonium carbonate to react with high-purity calcium chloride to produce high-purity calcium carbonate for startup of the process can be accomplished by first purchasing ammonium carbonate powder, such as that from Keystone Universal Corp., Melvindale, Mich., as "Powder ACS." Purified calcium chloride solution is removed and stored in a storage tank (not shown) connected to the reagent hopper (72). Calcium chloride solution is removed through the precipitation tank outlet (68) and transferred by the product pump (66) to the liquid product outlet (77). To the reagent hopper (72), 38 lb. of ammonium carbonate is added to 9 gallons of deionized water. Forty-one ml of ammonium polysulfide and 17 ml of 30% hydrogen peroxide is added and the product pumped into the precipitation tank (56) by the condenser pump (58) and the addition of deionized water from the deionized water tank (71). The process described above for purification of calcium chloride is repeated to achieve the above assay specifications for trace minerals.

When purification of the ammonium carbonate solution is achieved, ammonium carbonate is removed and stored in a tank connected to the reagent hopper (72). It is necessary to add the ammonium carbonate solution to the calcium chloride solution. An amount of purified calcium chloride solution that has a dry weight of 19.25 lb. high purity calcium chloride is transferred to the reagent hopper and to the precipitation tank (56), which has not been washed to remove ammonium carbonate solution. Steam produced by the boiler (10) is used to maintain a temperature of 160° F. within the tank (56). The pH of the tank contents is adjusted to 7.5 by adding ammonia gas through the liquid product outlet (77) through port (57). The purified ammonium carbonate is added at a slow rate which increases the size of precipitated particles. A rate of 280 ml per minute is preferred and the time for the reaction is about 2 hours. Precipitated calcium carbonate is formed and removed from the tank (56) through bottom outlet (68). The removed calcium carbonate is then filtered in the product filter (67), washed with deionized water to remove ammonium chloride and stored for use in the process. The produced ammonium chloride solution remaining in the precipitation tank (56) is removed and stored for later conversion to calcium chloride by the recovery of ammonia according to the process described above.

Care must be taken to discard the filter canisters used to filter alkaline metal sulfides. Current waste disposal laws prohibit disposal of these minerals without stabilization due to the potential hazards to ground water. The filters can be burned in a oven to remove the filter media, usually plastic, and afterwards, the ash is recovered and combined with water. Reserved lime, recovered from the magnesium precipitation process described, is mixed with the mineral ash, water and leonardite or lignite coal. The blend of ash and leonardite, having a humic acid content of 80%, is 25% leonardite. Lime should be added to obtain a pH between 11 and 12. Water is added to allow the products to mix well in a cement mixer and to hydrate the lime.

The process can stabilize a wide range of metallic polyvalent cations that may otherwise be leached at lower pH ranges by using native humic acids contained in leonardite or less abundantly in lignite. The final material can be processed with additional leonardite and lime until the concentrations of soluble minerals when leached at a pH of 4.0. are only trace. The products are useful as a non-leachable storage and source of essential trace minerals for agriculture or horticulture. The processed mixture of leonarditer lime and alkaline minerals can be beneficially added to turf grass or agriculture at the rate of 50 to 100 lb. per acre. The produced material can also be used to enhance the rate of composting and quality of composted organic waste.

The invention described refers to readily available equipment or equipment which can be easily fabricated using standard manufacturing processes. The process can be up-scaled to accommodate higher productivity by increasing the size of reactors or adding additional reactors of the same scale. An economical method to increase the production rate would be to first add additional branches for connection of additional tube reactors to the condenser. By adding the branches radially, the productivity of the process can be increased many times, where only increasing the rate of processing in other reactor vessels may be required.

The invention provides several advantages over the prior art. The invention allows HRGs and halons to be used as feedstock for manufacturing high-purity calcium fluoride, calcium chloride, calcium carbonate and for the recovery of bromine as calcium bromide. It is necessary to obtain high-purity calcium salts for the manufacturing of halophosphate phosphors used to manufacture fluorescent lighting devices. Halon transformation provides similar products and reclaims bromide in mixtures of calcium chloride and calcium bromide that are useful for clear well drilling fluids.

Calcium fluoride has additional uses in many other markets. One growing use of relatively high-purity calcium fluoride is for drinking water fluoridation. When calcium fluoride is produced by the process invented, it can be used directly for water fluoridation and is many times safer to use than other sources of fluoride.

Calcium carbonate produced by the scrubbing of carbon dioxide in accordance with the invention is also a beneficial by-product in the transformation of HRGs. The calcium carbonate, that it not necessarily high purity can be used in the plastics industry and for use in foods and animal feeds. Acid soils resulting from over-use of nitrate and ammonia fertilizers require neutralization with lime, where micro-fine particles are required for efficient and economic results. An economic source of precipitated calcium carbonate, manufactured by scrubbing carbon dioxide by the invented process, can be marketed for use in agriculture and horticulture. Small, near-micron size particles of calcium carbonate, produced by the process, can be transferred through irrigation systems, even by drip irrigation, to not only neutralize soil acid, but also to produce the proper calcium to nitrogen ratio in plant tissues.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

I claim:

1. A method of forming calcium halide salts from halocarbon gases comprising:
   introducing a mixture of oxygen, a combustible fuel gas, steam and a halocarbon gas into a reactor;
   simultaneously injecting a calcium reagent into the reactor with the mixture; and then
   igniting the mixture, along with the injected calcium reagent, within the reactor to decompose the halocarbon gas so that halogen constituents of the halocarbon gas are released within the reactor to react with the calcium reagent to form calcium halide salts.

2. The method of claim 1, wherein:
   the combustible fuel is hydrogen gas.

3. The method of claim 1, wherein:
   the calcium reagent is selected from a group consisting of calcium hydroxide, calcium oxide and calcium carbonate.

4. The method of claim 1, wherein
   the calcium reagent is selected from a group consisting of calcium chloride, calcium hydroxide, calcium oxide and calcium carbonate; and wherein
   the halocarbon gas contains fluorine and the calcium halide salt is calcium fluoride.

5. The method of claim 1, wherein:
   the halocarbon gas contains flourine: and
   the calcium halide salt formed are calcium fluoride salts.

6. A method of forming calcium fluoride salts from halocarbon gases containing fluorine comprising:
   introducing a mixture of oxygen, hydrogen, steam and a halocarbon gas containing fluorine into a reactor;
   simultaneously injecting a calcium reagent into the reactor with the mixture; and then
   igniting the mixture, along with the injected calcium reagent, within the reactor to form decomposition products with fluorine being released within the reactor to react with the calcium reagent to form calcium fluoride.

7. The method of claim 6, wherein:
   the calcium reagent is selected from a group consisting of calcium chloride, calcium hydroxide, calcium oxide and calcium carbonate.

8. The method of claim 6, wherein:
   the calcium fluoride salts are formed in the transformation of halocarbon gases into nongaseous products; and further comprising:
   cooling the decomposition products formed from the decomposition of the halocarbon gas by contacting the decomposition products with an aqueous cooling fluid so that at least some of the decomposition products are collected and carried along with calcium fluoride which is precipitated as particles in an aqueous liquid phase; and
   filtering the liquid phase to separate the calcium fluoride particles from the aqueous liquid phase.

9. The method of claim 8, further comprising:
   neutralizing acids formed during the decomposition of the halocarbon gases which are present in the aqueous liquid phase prior to filtering.

10. The method of claim 9, wherein:
    neutralizing acids includes admixing calcium carbonate to the aqueous liquid phase.

11. The method of claim 8, wherein:
    the cooling fluid is an aqueous calcium chloride solution.

12. The method of claim 10, wherein:
    at least one of the calcium reagent and the halocarbon gas contains chlorine; and
    hydrochloric acid is one of the decomposition products carried in the aqueous liquid phase, the calcium carbonate reacting with the hydrochloric acid in the aqueous liquid phase during neutralizing to form calcium chloride; and further comprising
    utilizing the aqueous liquid phase as the aqueous cooling fluid for cooling the decomposition products.

13. The method of claim 8, wherein:

carbon dioxide gas is one of the decomposition products; and further comprising intermixing the carbon dioxide gas with ammonia and a solution of calcium chloride so that the carbon dioxide gas reacts with the ammonia and calcium chloride to form calcium carbonate.

14. The method of claim 8, wherein:

at least one of the calcium reagent and the halocarbon gas contains chlorine; and chlorine gas is one of the decomposition products; and further comprising intermixing the chlorine gas with hydrogen peroxide and calcium hydroxide solution to form calcium chloride.

15. The method of claim 14, wherein:

the calcium chloride formed is used as the calcium reagent.

16. The method of claim 8, wherein:

carbon dioxide gas is one of the decomposition products; and further comprising intermixing the carbon dioxide gas with ammonia and a solution of calcium chloride so that the carbon dioxide gas reacts with the ammonia and calcium chloride to form calcium carbonate; then admixing the calcium carbonate to the aqueous liquid phase prior to the step of filtering to neutralize acids formed during the decomposition of the halocarbon gases which are present in the aqueous liquid phase.

17. The method of claim 8, wherein:

at least one of the calcium reagent and the halocarbon gas contains chlorine; and carbon dioxide gas and hydrochloric acid are both decomposition products formed in the reactor with the hydrochloric acid being carried in the aqueous liquid phase; and further comprising introducing the aqueous liquid phase from the reactor into an enclosed vessel;

admixing calcium carbonate to the aqueous liquid phase within the enclosed vessel so that the calcium carbonate reacts with the hydrochloric acid to form carbon dioxide gas and calcium chloride;

utilizing a selected amount of the aqueous liquid phase from the enclosed vessel as the aqueous cooling fluid for cooling the decomposition products;

collecting the carbon dioxide gas from the reactor and the enclosed vessel and intermixing the collected carbon dioxide gas with an ammonia source and a solution of calcium chloride so that the carbon dioxide gas reacts with the ammonia source and calcium chloride to form calcium carbonate; and then admixing the calcium carbonate formed to the aqueous liquid phase within the enclosed vessel for reacting with the hydrochloric acid.

18. The method of claim 17, wherein:

ammonium chloride is also formed along with the calcium carbonate; and further comprising mixing the ammonium chloride with calcium hydroxide to produce calcium chloride product and ammonia gas;

utilizing the ammonia gas as the ammonia source; and utilizing the calcium chloride product as the calcium reagent.

19. A method of transforming halocarbon gases into nongaseous products, the method comprising:

introducing a mixture of oxygen, a combustible fuel gas, steam and a halocarbon gas into a reactor;

simultaneously injecting a calcium reagent into the reactor with the mixture; then igniting the mixture along with the injected calcium reagent within the reactor to form decomposition products, with halogen constituents of the halocarbon gas being released within the reactor to react with the calcium reagent to form calcium halide salts, and wherein carbon constituents of the halocarbon gas react with oxygen to form carbon dioxide gas; and reacting the released carbon dioxide gas with ammonia and an aqueous solution of calcium chloride so that the released carbon dioxide gas reacts with the ammonia and calcium chloride to form calcium carbonate.

20. The method of claim 19, further comprising:

reacting other gaseous decomposition products so that said other gaseous decomposition products are transformed into nongaseous products.

21. The method of claim 20, further comprising:

utilizing at least some of the nongaseous decomposition products to form the calcium reagent.

* * * * *